US006731284B1

(12) United States Patent
Oxaal

(10) Patent No.: US 6,731,284 B1
(45) Date of Patent: May 4, 2004

(54) METHOD OF AND APPARATUS FOR PERFORMING PERSPECTIVE TRANSFORMATION OF VISIBLE STIMULI

(76) Inventor: Ford Oxaal, 212 3rd St., #3D, Troy, NY (US) 12180

( * ) Notice: Subject to any disclaimer, the term of this patent is extended or adjusted under 35 U.S.C. 154(b) by 40 days.

(21) Appl. No.: 09/676,079

(22) Filed: Oct. 2, 2000

Related U.S. Application Data

(63) Continuation of application No. 09/312,959, filed on May 17, 1999, now Pat. No. 6,157,385, which is a continuation of application No. 08/813,873, filed on Mar. 7, 1997, now Pat. No. 5,936,630, which is a continuation of application No. 08/478,839, filed on Jun. 7, 1995, now Pat. No. 5,684,937, which is a continuation of application No. 07/990,250, filed on Dec. 14, 1992, now abandoned.

(51) Int. Cl.⁷ .............................................. G06T 15/00
(52) U.S. Cl. ...................................................... 345/427
(58) Field of Search ................................ 345/419, 423, 345/427, 620, 626, 627; 348/38, 39, 264, 383, 744, 776; 352/70; 353/82; 359/363; 396/20

(56) References Cited

U.S. PATENT DOCUMENTS

| 1,730,346 A | 10/1929 | Beeson et al. |
|---|---|---|
| 3,183,810 A | 5/1965 | Campbell et al. |
| 3,723,805 A | 3/1973 | Scarpino et al. |
| 4,125,862 A | 11/1978 | Catano |
| 4,152,724 A | 5/1979 | Hunter |
| 4,172,264 A | 10/1979 | Taylor et al. |
| 4,191,967 A | 3/1980 | Dansac et al. |
| 4,214,821 A | 7/1980 | Termes |
| 4,334,245 A | 6/1982 | Michael |
| 4,463,380 A | 7/1984 | Hooks, Jr. |
| 4,518,898 A | 5/1985 | Tarnowski et al. |
| 4,549,208 A | 10/1985 | Kamejima et al. |
| 4,563,703 A | 1/1986 | Taylor et al. |
| 4,591,250 A | 5/1986 | Woodruff |
| 4,656,506 A | 4/1987 | Ritchey |

(List continued on next page.)

FOREIGN PATENT DOCUMENTS

| JP | 2/127877 | 5/1990 |
|---|---|---|
| WO | 82/03712 | 10/1982 |
| WO | 96/08105 | 3/1995 |
| WO | 96/26611 | 8/1996 |

OTHER PUBLICATIONS

M. Onoe et al., :Digital Processing of Images Taken by Fish–Eye Lens, IEEE: Processing, New York 1982, vol. 1, pp. 105–108.

N. Greene, "Enviroment Mapping and Other Applications of World Projections", IEEE Computer Graphics and Applications, Nov. 1986, pp. 21–29.

N. Greene, "A Method of Modeling Sky for Computer Animations", Proc. First Int'l. Conf. Engineering and Computer Graphics, Aug. 1984, pp. 297–300.

(List continued on next page.)

Primary Examiner—Almis R. Jankus
(74) Attorney, Agent, or Firm—Robert Westerlund; Raymond Powell

(57) ABSTRACT

The principle purpose of the present invention is to provide an image processing system which uses the two methods to form visible stimuli which depict visual shape. In particular, the present invention either transforms a first visible configuration to a second visible configuration that depicts (in one of the two possible ways given) the visual shapes induced by the first visible configuration, or it determines the visible configuration necessary to depict the desired visual configuration. Using the present invention, it is possible to transform a full 360 degrees of visible space (i.e., front, back, up, down, right and left directional views) onto a single display surface.

29 Claims, 9 Drawing Sheets

U.S. PATENT DOCUMENTS

| | | | |
|---|---|---|---|
| 4,661,855 | A | 4/1987 | Gulck |
| 4,670,648 | A | 6/1987 | Hall et al. |
| 4,728,839 | A | 3/1988 | Coughlan et al. |
| 4,734,779 | A | 3/1988 | Levis et al. |
| 4,736,436 | A | 4/1988 | Yasukawa et al. |
| 4,751,660 | A | 6/1988 | Hedley |
| 4,772,942 | A | 9/1988 | Tuck |
| 4,797,942 | A | 1/1989 | Burt |
| 4,807,158 | A | 2/1989 | Blanton et al. |
| 4,835,532 | A | 5/1989 | Fant |
| 4,843,568 | A | 6/1989 | Krueger et al. |
| 4,858,002 | A | 8/1989 | Zobel |
| 4,858,149 | A | 8/1989 | Quarendon |
| 4,899,293 | A | 2/1990 | Dawson et al. |
| 4,918,473 | A | 4/1990 | Blackshear |
| 4,924,094 | A | 5/1990 | Moore |
| 4,949,108 | A | 8/1990 | Verret |
| 5,005,083 | A | 4/1991 | Grage et al. |
| 5,020,114 | A | 5/1991 | Fujioka et al. |
| 5,023,725 | A | 6/1991 | McCutchen |
| 5,048,102 | A | 9/1991 | Tararine et al. |
| 5,067,019 | A | 11/1991 | Juday et al. |
| 5,068,735 | A | 11/1991 | Tuchiya et al. |
| 5,077,609 | A | 12/1991 | Manelphe |
| 5,130,794 | A | 7/1992 | Ritchey |
| 5,157,491 | A | 10/1992 | Kassatly |
| 5,159,368 | A | 10/1992 | Zemlin |
| 5,173,948 | A | 12/1992 | Blackham et al. |
| 5,175,808 | A | 12/1992 | Sayre |
| 5,185,657 | A | 2/1993 | Ozaki et al. |
| 5,185,667 | A | 2/1993 | Zimmermann |
| 5,200,818 | A | 4/1993 | Neta et al. |
| 5,231,673 | A | 7/1993 | Elenga |
| 5,259,584 | A | 11/1993 | Wainwright |
| 5,280,540 | A | 1/1994 | Addeo et al. |
| 5,313,306 | A | 5/1994 | Kuban et al. |
| 5,359,363 | A | 10/1994 | Kuban et al. |
| 5,384,588 | A | 1/1995 | Martin et al. |
| 5,396,583 | A | 3/1995 | Chen et al. |
| 5,432,871 | A | 7/1995 | Novik |
| 5,444,476 | A | 8/1995 | Conway |
| 5,479,203 | A | 12/1995 | Kawai et al. |
| 5,499,146 | A | 3/1996 | Donahue et al. |
| 5,539,483 | A | 7/1996 | Nalwa |
| 5,550,646 | A | 8/1996 | Hassan et al. |
| 5,606,365 | A | 2/1997 | Maurinus et al. |
| 5,682,511 | A | 10/1997 | Sposato et al. |
| 5,703,604 | A | 12/1997 | McCutchen |

OTHER PUBLICATIONS

J. Blinn et al., "Texture and Reflection in Computer Generated Images, "Comm. ACM, vol. 19, No. 10 1976, pp. 542–547.

A. Paeth, "Digital Cartography for Computer Graphics", Graphics Gems, 1990. pp. 307–320.

J.D. Foley, et al., "Computer Graphics: Principles and Practice", 1990, 1996, pp. 229–381.

S. Morris, "Digital Video Interactive—A New Integrated Format for Multi–Media Information", Microcomputer for Information Management, Dec. 1987, 4(4):249–261.

Ritchey "Image Based Panoramic Virtual Reality System" pp. 2–14, Feb. 1992.

Dixon, D., "DVI Video/Graphics" Computer Graphics World (Jul. 1987).

Acquiring full Sphere Images, Nearfield Systems, Inc. (1996) @http://www.nearfield.com.

Slater, D. "A Full Sphere Camera for Point of View and VR Photography," Nearfield System, Inc. (1996) @http:www.nearfield.com.

Slater, D. "Panoramic Photography with Fisheye Lenses," Nearfield System, Inc. (1995) @http://www.nearfield.com.

NASA's Tina Camera Has a Wide–Angle Future, Science & Technology, business Week, pp. 54–55, Mar. 6, 1995.

F. Kenton Musgrave, "A Panoramic Virtual Screen for Ray Tracing", Graphics Gems, 1992, pp. 288–294.

"Declaration of Scott Gilbert in support of Defendant Infinite Pictures" Memorandum in Opposition to Plaintiff's Motion for Preliminary Injunction, Omniview, Inc. V. Infinite Pictures, Inc. Civ. Action No. 3–96–849.

N. Greene et al., Creating Raster Omnimax Inages from Multiple Perspective Views Using the Elliptical Weighted Average Filter, IEEE Computer Graphics and Applications, Jun. 1986, pp. 21–27.

S. Ray, "The Lens in Action", Hastings House, 1976, pp. 114–117.

F. Pearson II, "Map Projections Theory and Applications". CRC Press, Inc., 1990, pp. 215–345.

G. Wolbert, "Digital Image Warping", IEEE Computer Society Press. 1998.

Intel; DVI Technology, Action Media 750 Production Tool Reference, Order No. 463629–004.

G. David Ripley, "DVI–A Digital Multimedia Technology", Communications of the ACM Jul. 1989, vol. 32 No. 7, pp. 811–822.

R. Felix, "The Omnigraph".

k=2

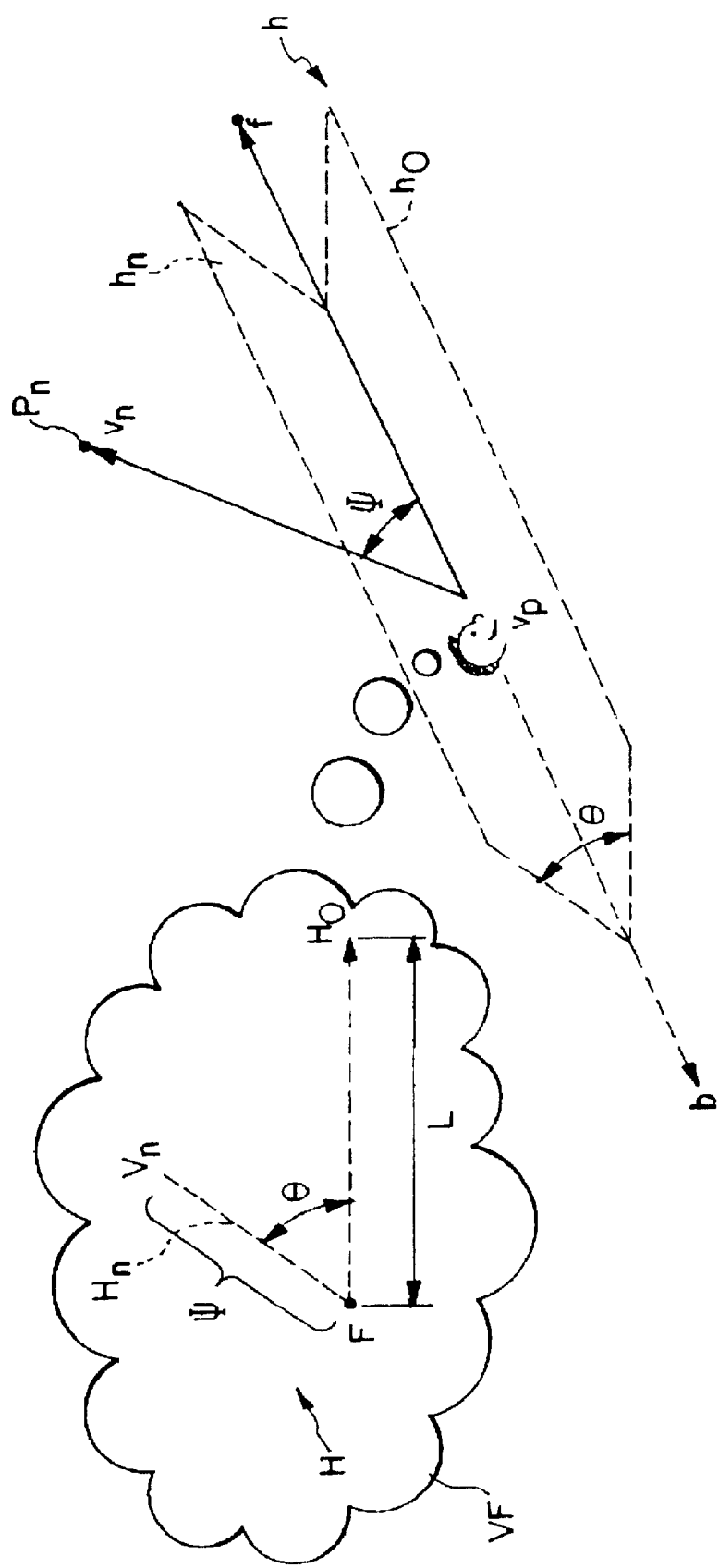

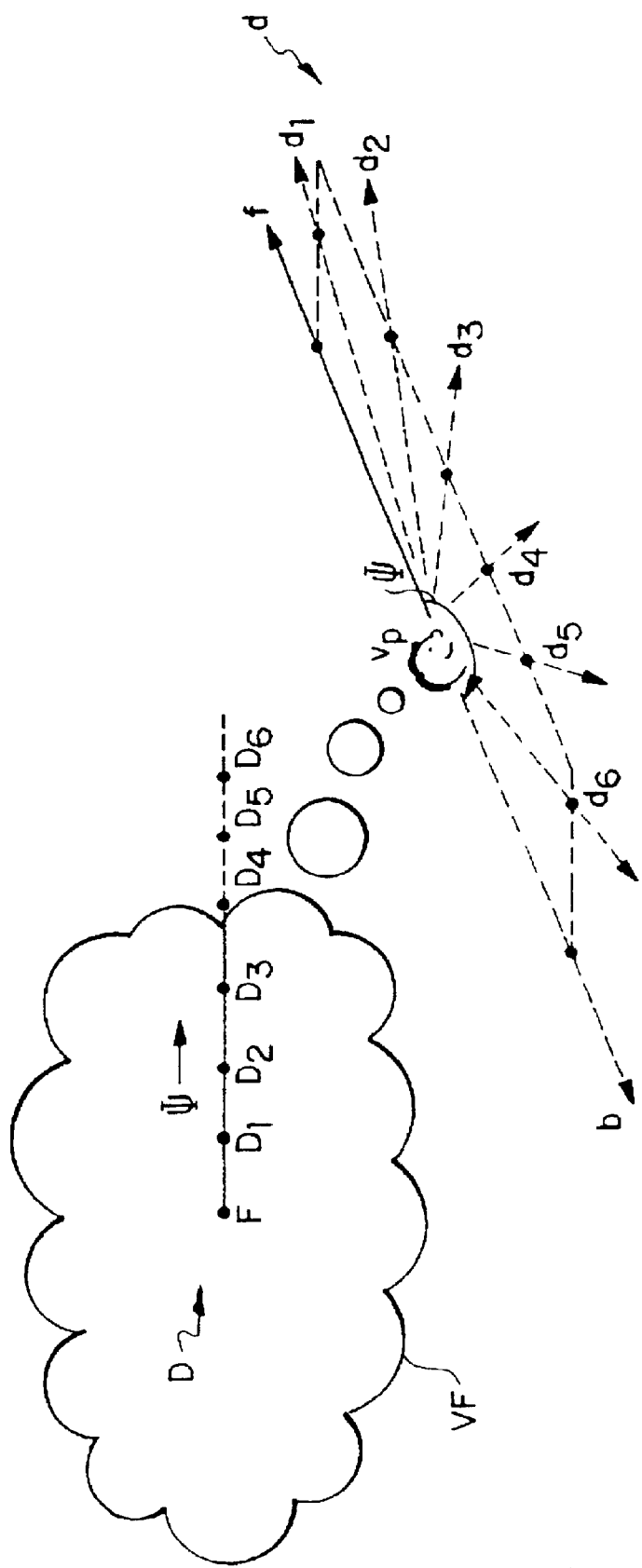

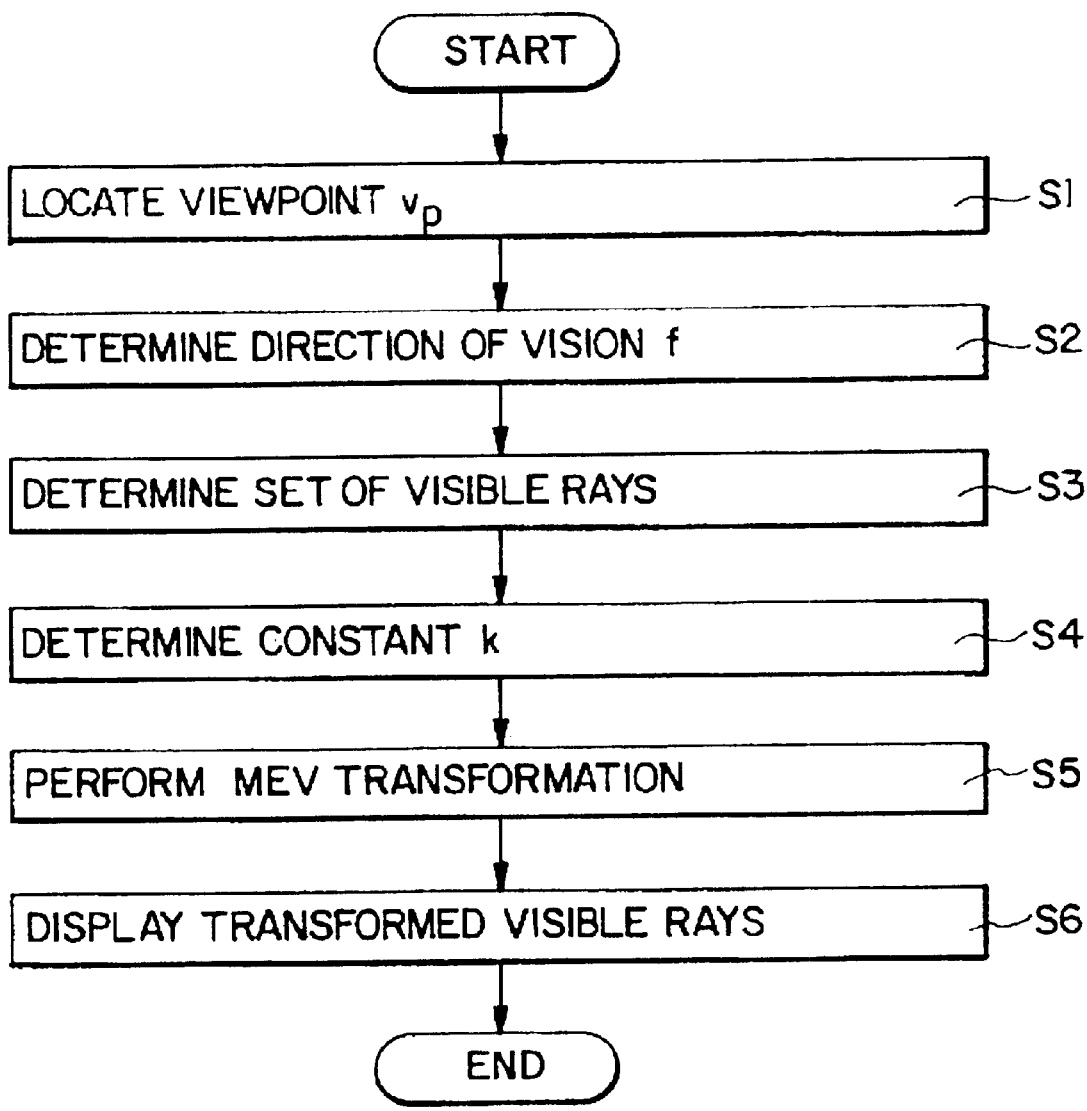

METHOD OF AND APPARATUS FOR PERFORMING PERSPECTIVE TRANSFORMATION OF VISIBLE STIMULI

This is a Continuation of U.S. application Ser. No. 09/312,959, which was filed on May 17, 1999, now U.S. Pat. No. 6,157,385, on Dec. 5, 2000, which is a Continuation of U.S. application Ser. No. 08/813,873, which was filed on Mar. 7, 1997, and issued as U.S. Pat. No. 5,936,630 on Aug. 10, 1999, which is a Continuation of (including streamline cont.) U.S. application Ser. No. 08/478,839, which was filed on Jun. 7, 1995, and issued as U.S. Pat. No. 5,684,937 on Nov. 4, 1997, which is a continuation of application Ser. No. 07/990,250, which was filed on Dec. 14, 1992, and is now abandoned.

FIELD OF THE INVENTION

The present invention relates generally to generating perspective stimuli. More specifically, the present invention relates to a method of and apparatus for performing perspective of input visible stimuli to produce resultant visible stimuli maintaining visual similarity with the input visible stimuli.

BACKGROUND OF THE INVENTION

Systems and techniques for changing the perspective of a visible image in producing a resultant image, or systems and methods of transforming an image from one perspective form to another have been the subject of scientific thought and research for many years. For example, an early work entitled "A Treatise on the Curvilinear Perspective of Nature and its Applicability to Art" by Herdman indicates that linear perspective is not in agreement with the way humans actually perceive the universe. Herdman suggests that curvilinear perspective is in closer agreement with nature. Herdman discloses techniques for constructing images by mapping image points onto curves rather than mapping points onto lines vanishing to a point as is done when employing conventional linear perspective techniques.

Other systems and techniques for transforming visible images can generally be divided into three separate categories 1) perspective generation systems and methods suitable for applications such as flight simulators; 2) three-dimensional (3D) to two-dimensional (2D) conversion systems and methods; and 3) miscellaneous systems and methods.

The first category includes U.S. Pat. No. 3,725,563, which discloses a method of and apparatus for raster scan transformations using rectangular coordinates which are suitable for electronically generating images for flight simulators and the like. More specifically, the patent discloses a technique for raster shaping, whereby an image containing information from one viewpoint is transformed to a simulated image from another viewpoint. On the other hand, U.S. Pat. No. 4,763,280 discloses a curvilinear dynamic image generation system for projecting rectangular coordinate images onto a spherical display surface. In the disclosed system, rectangular coordinates are converted to spherical coordinates and then the spherical coordinates are distorted for accomplishing the desired simulation of curvature.

U.S. Pat. No. 4,660,157 discloses a real-time video perspective digital map display method wherein compressed data stored in the frequency domain is interpolated and displayed as a three-dimensional image based on airplane orientation and altitude. In addition, U.S. Pat. No. 4,489,389 discloses a real-time video perspective digital map display including a memory for storing digital data representing a two-dimensional pattern of elevation information, circuitry for generating height and location of a viewing point, circuitry for reading out elevation data out of memory, and perspective transformation circuitry for transforming elevation data into pixel data specifying a pixel location in a perspective display.

U.S. Pat. No. 3,060,596 discloses an electronic system for generating a perspective image using a planar image of a plan view with respect to a viewpoint positioned at a known spot and elevation above the plan view. U.S. Pat. No. 4,474,501 discloses optical simulation of scenic translation using a plurality of parallel image strips.

The second category of systems and techniques perform 3D-to-2D conversion, or vice versa. For example, U.S. Pat. No. 4,821,209 discloses a method of and apparatus for data transformation and clipping in a graphic display system, wherein data transformation is accomplished by matrix multiplication. On the other hand, U.S. Pat. No. 4,667,236 discloses a television perspective effects system for providing perspective projection whereby each point of a three-dimensional object is projected onto a two-dimensional plane. New coordinates X' and Y' are prepared from the original coordinates X, Y and Z, and the viewing distance D, using the general formulas $X'=XD/Z$ and $Y'=YD/Z$. As the object to be displayed is rotated around the X or Y axis, the viewing distance D is changed for each point.

U.S. Pat. No. 4,721,952 discloses an apparatus for and process of graphically representing three-dimensional objects in two dimensions. In particular, a three-dimensional object is illustrated by a plurality of parallel surface sections, where each surface section is offset from the adjacent sections by a prescribed perspective offset. Another method is disclosed in U.S. Pat. No. 4,752,828, which describes a method of producing geometrical transformations on a video image. In particular, an original image can be transformed into a transformed image by matrix multiplication with respect to the origin of a reference plane.

U.S. Pat. No. 4,819,192 discloses a method of displaying images wherein a three-dimensional object is displayed on a two-dimensional raster scan device. More specifically, the method includes the steps of dividing the surface of an object into a plurality of triangular surfaces, determining data with respect to the three apexes, and transforming the apex data as determined with respect to an observing point into second sets of three apexes. Additionally, U.S. Pat. No. 4,127,849 discloses a system for converting coded data into display data wherein three-dimensional data is converted into two-dimensional data. In particular, a three-dimensional matrix is projected onto a plane to form a two-dimensional dot matrix or line matrix, which can be subsequently converted into a linear array.

U.S. Pat. No. 4,734,690 discloses a method of an apparatus for spherical panning wherein a three-dimensional object located at the view motion center of a spherical space can be viewed from a plurality of viewpoints defined by latitude and longitude data. U.S. Pat. No. 4,754,269 discloses a method and apparatus for transforming three-dimensional coordinates of a perspective view into two-dimensional coordinates suitable for display on a CRT. According to one aspect of the apparatus, the CRT image can be rotated to simulate a change in the viewpoint with respect to the simulated three-dimensional object. A three-dimensional to two-dimension algorithm is also disclosed.

In the third category, miscellaneous systems and methods are disclosed by, for example, U.S. Pat. No. 5,027,287, which describes a device for the digital processing of images to obtain special geometrical effects wherein digital image data corresponding to intersection points on a rectangular X,Y grid are transposed by interpolation with respect to intersection points of a curved surface. U.S. Pat. No. 4,882,679, on the other hand, discloses a system and associated method of reformatting images for three-dimensional display. The disclosed system is particularly useful for generating three-dimensional images from data generated by diagnostic equipment, such as magnetic resonance imaging.

SUMMARY OF THE INVENTION

The present invention was motivated by the discovery that, given visible stimuli of some shape and proportion, the shape induced in the mind of the viewer is of a different proportion. Once those different proportions inside the mind of the viewer are determined, however, new visible stimuli can be formed as an external manifestation of those different proportions induced in the viewer's mind.

There are two possible methods of externally depicting "visual" proportions. (The term "visual" used herein refers to the perception caused by some external stimuli, and "visible" refers to the external stimuli itself. That is, "visual" is internal to the viewer, i.e., within one's mind, and "visible" is external to the viewer.) The first method of externally depicting "visual" proportions is to simply map those visual proportions onto a visible flat surface. The second method is to create visible stimuli which induces shapes in the mind of the viewer which are the same as the visual proportions being depicted, but of a different perceived size.

It should be noted that traditional pictorial visible stimuli induces shapes in the mind of the viewer which are the same shape and size as the visual proportions induced by the subject matter visible stimuli being depicted. Thus, traditional pictorial visible stimuli are concerned with mimicking some original visible stimuli (such as a tree) as they exist in nature, whereas the present invention is concerned with mimicking the visual shapes either induced by some original visible stimuli, or dreamed or imagined in the mind of the viewer.

The principle purpose of the present invention is to provide an image processing system which uses the two methods to form visible stimuli which depict visual shape. In particular, the present invention either transforms a first visible configuration to a second visible configuration that depicts (in one of the two possible ways given) the visual shapes induced by the first visible configuration, or it determines the visible configuration necessary to depict the desired visual configuration.

Using the present invention, it is possible to transform a full 360 degrees of visible space (i.e., front, back, up, down, right and left directional views) onto a single display surface.

The above and other objects, features and advantages of the invention are disclosed in or will be apparent from the following description of the preferred embodiment.

BRIEF DESCRIPTION OF THE DRAWINGS

The preferred embodiments are described with reference to the drawings in which:

FIGS. 2a and 2b illustrate visible and visual configurations;

FIGS. 3a through 4b illustrative two fundamental relationships between visible and visual configurations;

FIG. 8 is a flow chart illustrating the method of the present invention.

DESCRIPTION OF THE PREFERRED EMBODIMENTS

In order to appreciate the present invention, it is important to understand the concepts of both geometric and visual shape similarity.

Figure 1A:
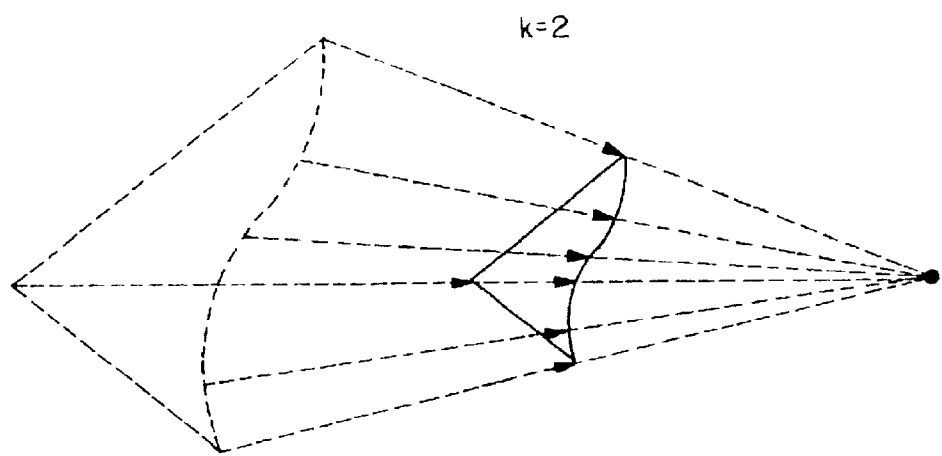
FIG. 1a illustrates geometric and visual shape similarity.

Geometric shape similarity is the concept that two or more shapes may be different in size, and yet have the same shape. This concept is based on the principle that shape is determined by proportion, not by actual size. Thus, one way to change a shape's size without changing its shape is to pick a reference point, determine the distances and directions to the reference point of all the points on the shape, and divide each of those distances by some constant k while maintaining all of the directions constant. This concept is shown in FIG. 1a.

Visual similarity is quite like geometric similarity. The distinction is simply that visual similarity operates on visual shapes (as perceived), whereas geometric similarity operates on non-visual shapes.

Figure 1B:
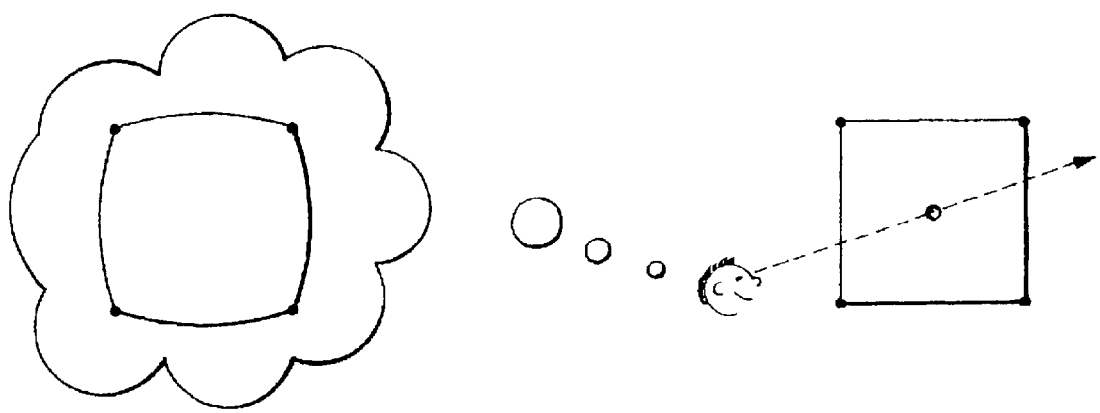
FIG. 1b illustrates the manner in which a given visible shape induces a visual shape that is not similar to the visible shape.

As described above, two shapes which are geometrically similar might not, when viewed, induce visual shapes which are visually similar. And, when a single geometric shape is viewed, the induced visual image might not have a similar shape. For example, a geometric square, if covering a sufficient angular area of one's visual field, will not look like a square at all, even when viewed perpendicularly to the plane of the square from the square's center. Instead, the edges of the square will appear in one's mind to bow out, and the angles of the corners of the square will appear to be more than the ninety degrees of the corners of the geometric (visible) square, as shown in FIG. 1b.

Figure 1C:
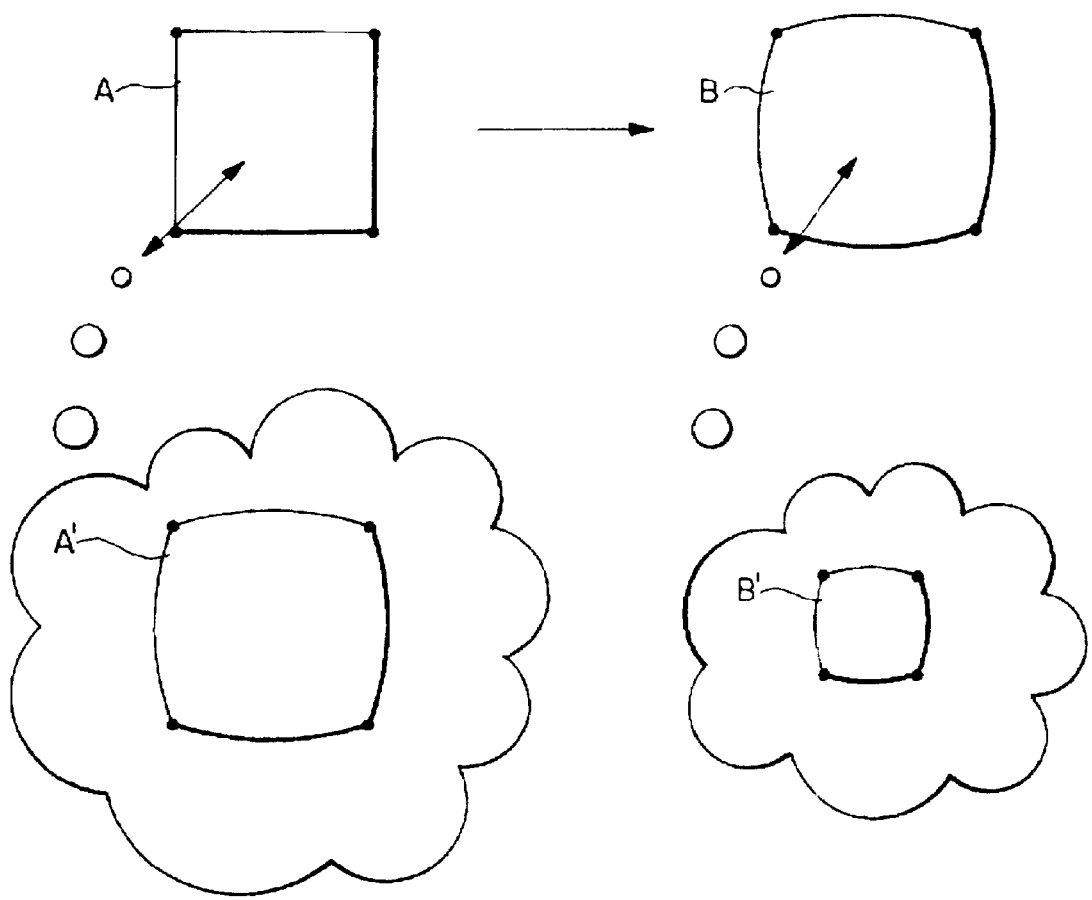
FIGS. 1c and 1d illustrate the main concepts of MindsEyeView™.

In general, the concept of MindsEyeView™, as shown in FIG. 1c, is that a given visible stimuli A, while induces visual shapes A' in the mind of a viewer (as represented by the cloud structure in the figures), may be transformed to a different visible stimuli B, which induces visual shapes B' that are visually similar (i.e., they appear as the same shape yet different size) to visual shapes A'. This unique transformation shall be referred to herein as "MindsEyeView™ transformation" or MEV™ transformation."

Figure 1D:
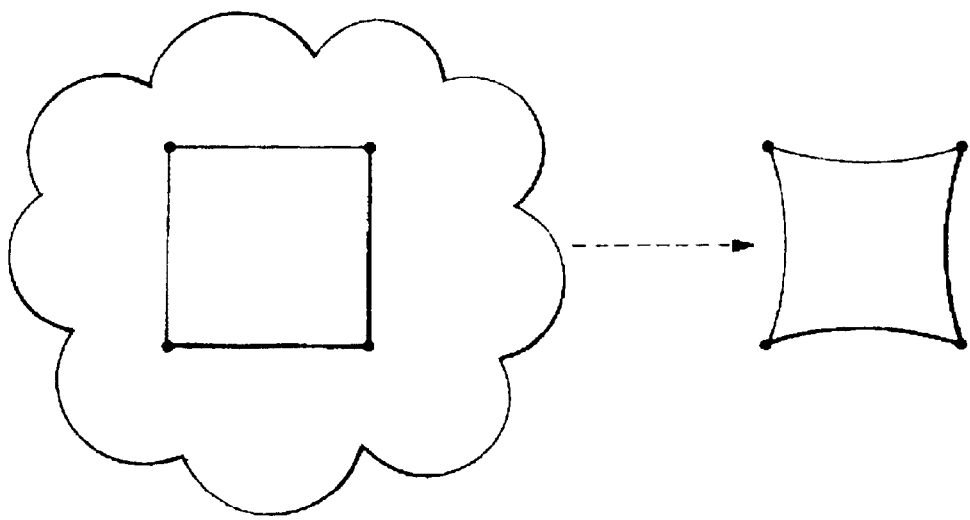

Included in the concept of MindsEyeView™ described above is that a given visual shape may be "reverse engineered" to produce an external visible shape which when viewed from the proper point and attended in the proper direction, will induce that given visual shape. This shall be referred to as the "reverse MindsEyeView™ transformation" or "MEV-R™ transformation," as shown in FIG. 1d.

The MEV™ transformation can be applied to any visible stimuli to produce a transformed visible stimuli, both of which stimuli may be represented by any suitable coordinate system. Likewise, the MEV-R™ transformation can be applied to any visual shape that may be represented in any suitable coordinate system, in order to produce visible stimuli which may be represented by any suitable coordinate system.

Before discussing the MEV™ and MEV-R™ transformation in detail, however, the relation between visible stimuli and their corresponding visual appearance will be discussed using two particular coordinate systems which lend themselves nicely to this relation:

1) The first coordinate system models the visible space external to the viewer. As shown in FIG. 2a, point vp models the viewpoint, i.e., the viewer's eye, and ray f models the direction the viewer is looking from the viewpoint. A set of half-planes h is defined as the set of all half-planes with a common edge line, which is the line containing ray f. One such half-plane $h_0$ is chosen as a reference. Now, any point $p_n$ visible from vp can be identified using a ray $v_n$ going from vp through $p_n$. This ray $v_n$ will lie in one and only one half-plane $h_n$ belonging to the set of half-planes h, with the exception of the ray f and ray b (opposite ray f), which will both lie in all the half-planes h. The orientation of this ray $v_n$ can be determined using a first angle $\theta$ that defines the degree of angular rotation between the reference half-plane $h_0$ and the half-plane $h_R$ in which the ray $v_n$ lies, and a second angle $\psi$ which defines the angular displacement between the ray f and the ray $v_n$. Rays $v_n$ will have $\psi$ values between 0 and $\pi$ radians ($0<\psi<\pi$), and will have $\theta$ values from 0 up to but not including $2\pi$ radians ($0 \leq \theta < 2\pi$).

When a set or subset of all possible rays emanating from point vp are configured, or reconfigured according to the MEV™ transformation, in this coordinate system, we are given what is termed a "visible configuration." It should be noted that, a visible configuration includes the rays $v_n$, a ray f containing the visible point being preferred, and a ray b, the ray opposite of ray f.

2) The second coordinate system maps the above visible space to the visual space internal to the viewer. In contrast to the visible space described above, the visual space now described is two-dimensional, and may be thought of as contained by a flat circle. (The coordinate system (1) above may be thought of as a sphere surrounding point vp.) As shown in FIG. 2b, point F models the location in visual space VF of the appearance of the visible point contained by ray f above, and the set of all line segments H of some length L emanating from point F correspond to the location in visual space VF of the appearance of the visible points lying in half-planes h above. A circle B (not shown) of radius L models the location in visual space of the visible point contained by ray b above. One line segment $H_0$ is chosen from the set H as a reference, and corresponds to half-plane $h_0$ above. Now, any point $V_n$ located within visual space VF will lie on one and only one line segment $H_n$ belonging to the set of line segments H, with the exception of the point F and circle B (which touch all the line segments H). The orientation of this point $V_n$ can be determined using an angle $\Theta$ that defines the degree of angular rotation between the reference line segment $H_0$ and the line segment $H_n$ in which the point $V_n$ lies, and a length $\Psi$ which defines the displacement between the point F and the point $V_n$. Points $V_n$ will have $\Psi$ values between 0 and L ($0<\Psi<L$), and have $\Theta$ values from 0 up to but not including $2\pi$ radians ($0 \leq \Theta 2\pi$).

When a set of all possible visual points are configured in this coordinate system, we are given what is termed a "visual configuration." It should be noted that a visual configuration includes the points $v_n$, a point F, and a circle B.

The two coordinate systems described are related as follows: there exists a bijection between the rays $v_n$, f, and b of the first system, and the points $V_n$, F, and circle B of the second system. As used herein, a "bijection" is a mapping between two sets of elements such that each element of the first set maps to one an only one element of the second set and vice versa. Thus, in the present case, two important mappings exist:

Mapping 1→2: if the scale of length L in the second system is set to $\pi$, then we may map each ray $v_n$ of the first system to each point $v_n$ of the second system by setting $\Theta$ equal to $\theta$, and $\Psi$ equal to $\psi$. Further, we may map ray f to point F, and ray b to circle B.

Mapping 2→1: If the scale of length L in the second system is set to $\pi$, we may also map each point $V_n$ of the second system to each ray $v_n$ of the first system by setting $\theta$ equal to $\Theta$ and $\psi$ equal to $\Psi$. Further, we may map point F to ray f, and circle B to ray b.

Thus, given a visible configuration defined by the first coordinate system, we may determine the corresponding visual configuration of the second coordinate system, and vice versa.

Figure 3A:
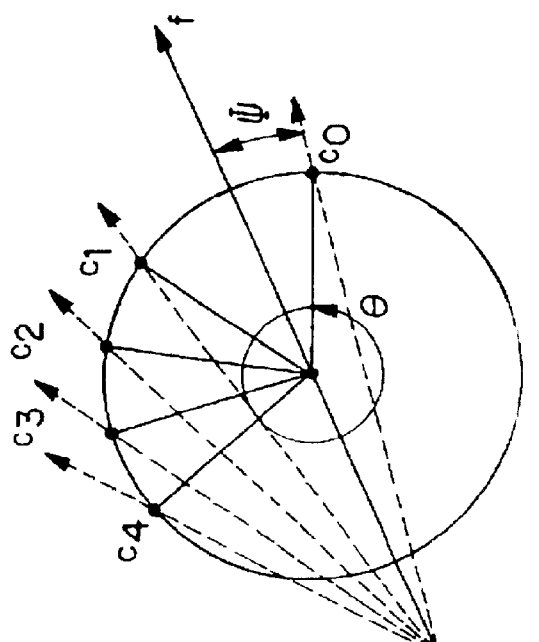
Figure 3B:
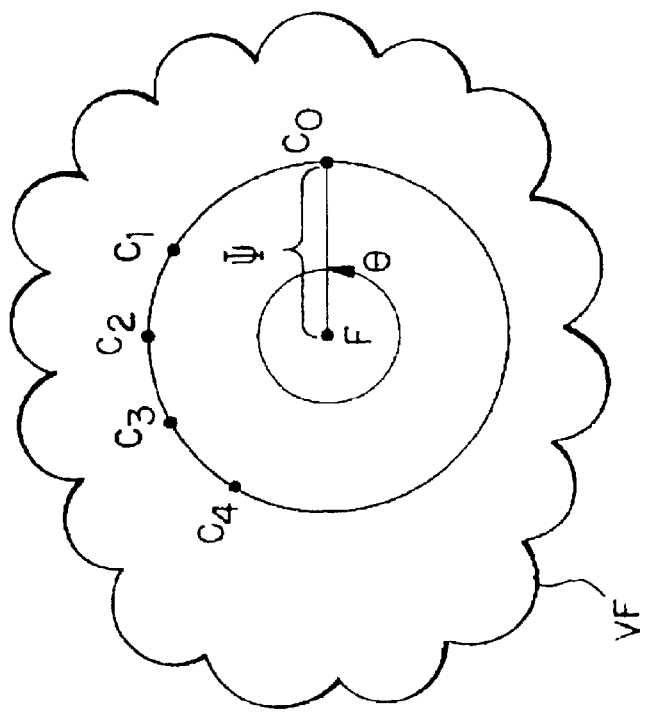

In an exemplary case, a visible configuration including a set of rays c, all having the same angular displacement $\psi$ from ray f (but different half-planar orientations $\theta$), is mapped to a visual configuration including a set of points C having the same displacement $\Psi$ from the focal point F (but different orientations $\Theta$), as shown in FIGS. 3a and 3b. In another exemplary case, a visible configuration including set of rays d, all having the same half-planar orientations $\theta$ (but different $\psi$ values), is mapped to a visual configuration including a set of points D lying on the same line segment of orientation $\Theta$ (but having different $\Psi$ values), as shown in FIGS. 4a and 4b.

The MEV™ transformation described above may now be performed as follows:

1. Start with a given visible configuration vf in coordinate system (1).
2. Determine the corresponding visual configuration VF of coordinate system (2) by performing the mapping 1→2.
3. Now, using the method of shape similarity described above and shown in FIG. 1a, use some constant k to transform VF to a new set of similar shapes VF'.
4. Finally, determine the visible configuration vf' which will induce visual shapes VF' by performing mapping 2→1 on VF'.

The new visible configuration vf' will now induce visual shapes in the mind of the viewer which are similar to the visual shapes induced by the original visible configuration vf.

The MEV-R™ transformation described above is achieved by performing mapping 2→1 on some given visual configuration VF.

With the above discussion in mind, it is possible to simplify the MEV™ transformation to two steps:

1. Start with a given visible configuration vf in coordinate system (1).
2. Use some constant k to divide the magnitude of each angle $\psi$ formed by each ray $v_n$ with ray f while maintaining the half-planar orientation $\theta$ of such ray, thus determining a transformed ray $v_n'$ for each ray $v_n$. These new rays $v_n'$ along with rays f and b form the desired transformed visible configuration vf'.

Again, visible configuration vf' will now induce visual shapes in the mind of the viewer which are similar to the visual shapes induced by the original visible configuration vf.

The visible configurations vf' derived by the transformation provide a whole range of possible induced visual shape reductions and expansions in the mind of the viewer. It will be appreciated that the desired effect is determined by the specified value of the predetermined constant k used to transform visible configuration vf to visible configuration vf'.

For example, if k is greater than 0, but k is less than 1, then the visual shapes induced retain the same original shape, but become larger in size than the original shapes. On the other hand, if k is greater than 1 then the visual shapes which are induced become smaller than the original shapes. It should be noted, however, that when k is equal to 2, the visible configuration vf' may be projected onto an infinite plane in its entirety. Such a problem produces an end result which is similar to that produced by a geometric construction technique known as "stereographic projection." If k is greater than 2, the visible configuration vf' may be projected onto a finite flat picture surface. Such a MEV™ transformation produces a visible configuration vf' which depicts a full 360° perspective of visible stimuli as seen by the viewer.

At the limit of the above described technique, i.e., where k approaches infinity, if the visible configuration vf' is projected onto an orthogonal planar surface, the projection forms physical proportions which are identical to the proportions of the visual shapes being represented. Such a picture is a physical representation of a mental phenomenon. It should also be noted that such a picture is similar to that obtained by a geometric construction known as "equidistant projection."

According to the present invention, the following necessary steps are used in generating an MEV™ image on any finite surface, as shown in FIG. 8. During step 1, locate a viewpoint vp in space. Then, during step 2, determine the direction f of vision from the viewpoint. Afterwards, during step 3, determine a set of visible rays having visible configuration vf which constitute a given visible scene or image. It should be noted that the given scene may be one or more physical images viewed by an observer represented by digitized image data stored in memory device, or may be an imaginary scene generated by computer animation or the like. During step 4, determine the constant k for use throughout the MEV™ transformation. Then, during step 5, perform the MEV™ transformation to generate a new visible configuration vf', as discussed in detail above. Finally, during step 6, project visible configuration vf' onto the desired picture surface. The resulting image is an MEV™ image.

Figure 5:
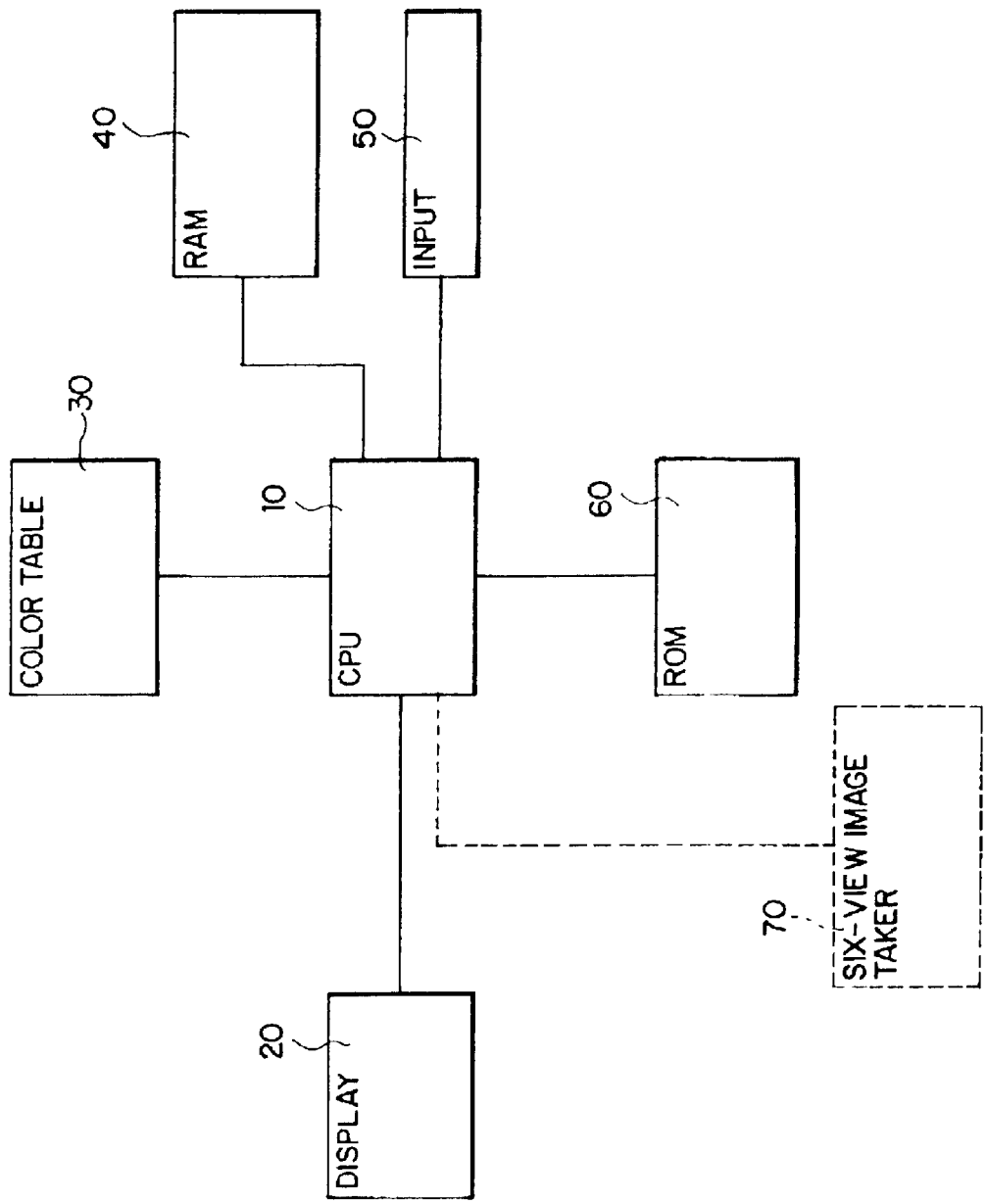
FIG. 5 illustrates an apparatus in accordance with the present invention.

The above described method of the invention may be performed, for example, by the apparatus shown in FIG. 5. This apparatus is composed of a central processing unit (CPU) 10 for controlling the components of the system in accordance with a control program stored in read-only memory (ROM) 60 or the like. The CPU 10 stores temporary data used during execution of the MEV™ transformation in random-access memory (RAM) 40. After the transformation, the transformed visible points are displayed on display device 20 (e.g., cathode ray tube (CRT)) as visible points in accordance with the appropriate color values stored in color table 30. As will be described in more detail below, a six-view image taker device 70, such as a camera or the like, may be used to generate different color values corresponding to the visible points of a viewed object, image or picture. An input device 50 is provided for entering data such as the viewer's viewing direction, reference plane, configuration (scaling) factor k, and other pertinent information used in the MEV™ transformation.

It will be noted that an algorithm may be used to increase the processing speed of the transformation. For example, a flat surface algorithm may be used to transform a visible configuration vf to a visible configuration vf' on a flat surface display. The flat surface algorithm, associates every point in a visible picture space with some image displaying physical space. If the color value of each point identified by a corresponding visible ray is known, it is possible to assign the picture point on the flat surface display associated with that ray with the same color. (Although use of the flat surface display is described in detail herein, it should apparent that the MEV™ transformation may be applied to any physical surface having one or more surface planes).

To map the MEV™ image upon a flat surface display, it is first necessary to assign the visible rays to the corresponding picture points of the flat surface. Thus, it is necessary to input integers X and Y, each representative of half the number of pixels of one side of a flat surface display space. In the current example, it is assumed that the flat surface display has a square shape and has 2X×2Y pixels as its dimensions. Then, a constant k is determined in order to specify the particular configuration of the MEV™ range. Next, the focal length is specified, in pixels, which represents the perpendicular distance between the viewer's viewpoint and the object plane from which the picture is to be viewed. The term "object plane" refers to the plane in which the actual object is to be viewed. The focal length determines the viewpoint vp and the viewing direction ray f in the model discussed above with respect to FIGS. 1a and 1b. It is also necessary to specify the scale, which can best be thought of as the radius of the displayed image in pixels.

A table of color values associated with a sample set of visible rays is also required. A color is returned from the color table by sending it data such as the direction of vision f, reference half plane $h_0$, and the coordinate pair $(\psi, \theta)$. Thus, it should be appreciated that the color table stores a set of visible rays $v_n$ that represent a digitized color image of a visible object of scene as viewed by the observer. The color table also contains two additional colors referenced by name, i.e., "background color" and "backward color." The background color is used by the algorithm, as discussed in greater detail below, when a pixel of a square image space is not included in the MindsEyeView™ picture space (i.e., visual field). For example, in the case where an MEV™ transformation is performed using a configuration where $k \approx \infty$, the displayed visual points $V_n$ will appear as a circular picture on the square-dimensional flat surface display. Thus, for the pixels in the areas of the display not included in the circular picture, the background color is used as the appropriate pixel color output from the color table. In an exemplary case, the background color is clear so that the color of the image between the viewer and the background point is unaffected by overlaying these points. Backward color is a color associated with ray b, which corresponds to the opposite direction of the line defined by ray f, as shown in FIG. 2a.

It will be appreciated that when $\psi$ is equal to $\pi$, a unique set of coordinates $(\psi, \theta)$ cannot be produced because the ray b does not form a unique half plane with the ray f. Thus, pixels corresponding to the visible ray b appearing directly behind the viewer are associated with the backward color information stored in the color table. Finally, a direction of vision f needs to be specified. Given the above information, the algorithm produces a color for each pixel (x,y) in the flat surface display space.

The algorithm assumes the value (0, 0) represents the pixel in the center of the square display space made up of 2X by 2Y pixels, where X is equal to Y. The following algorithm is produced in C-like pseudo-code.

```
for     (i = x; i < x; i = i + 1)
        {
        for (j = -y; j < y; j = j + 1)
                {
        distance = √ ‾‾‾‾‾ i² + j²;
        if (distance < scale);
                {
                ψ = arctan (distance/focallength)k;
                if (ψ = π) return backward;
                θ = arcos (i/distance);
                if (j < 0) then θ = (2 x π) - 0;
                return color (f, h₀, θ);
                }
        else if (k > 2) return background;
        }
}
```

The above algorithm handles all MindsEyeView™ configurations except for the case where k approaches infinity. In such case, the line "ψ=arctan (distance/focallength)k" should be changed to "ψ=(distance/scale)×π."

Those of ordinary skill in the art will appreciate that a ray-tracing system may replace its ray generator with the algorithm presented immediately above to convert the system into a MindsEyeView™ ray-tracer. In addition, a routine which does polygon scan-conversion and calculation of z-values for z-buffer visible surface techniques may be used with the algorithm discussed above to determine the direction of the point in space which is to be associated with the color value in the frame buffer or a z-value in the z-buffer in order to make the conversion to a MindsEyeView™ image.

Another preferred embodiment of the invention is a method of and apparatus for converting six distinct images to a single MindsEyeView™ image. The following MindsEyeView™ six-image conversion algorithm allows existing modeling/rendering software, such as the publicly available DKBTrace program, to work with the MindsEyeView™ flat surface algorithm in order to generate a MindsEyeView™ image. In order to use the MindsEye-View™ flat surface algorithm, it is necessary to generate a visible configuration vf. Existing modeling/rendering software will in most cases only be able to assign colors to some clipped portion of the visible configuration vf in a single pass.

Figure 6A:
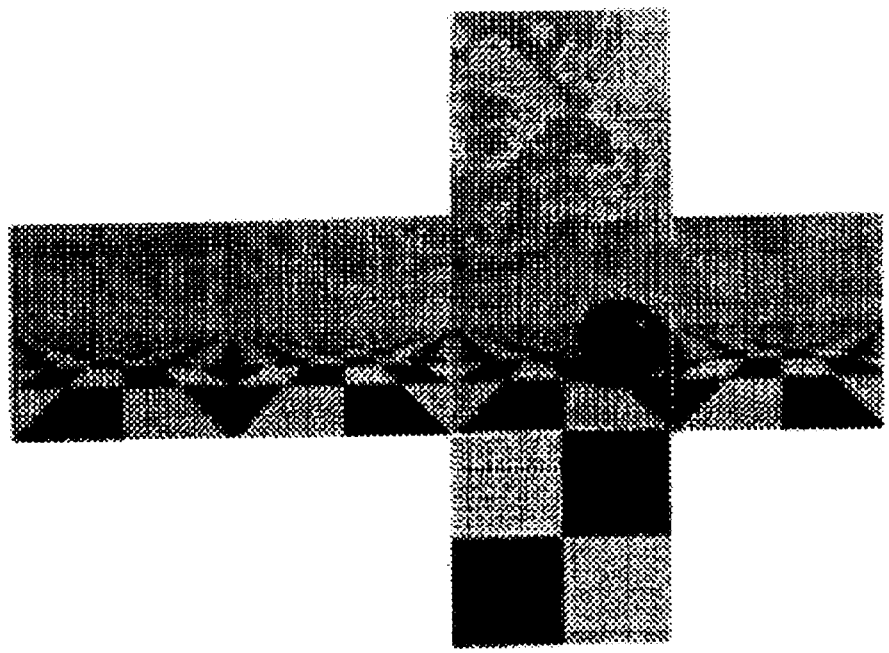
FIG. 6a illustrates a plurality of visible scenes received by a six-view image taker.

Using a six-view image taker 70 (FIG. 5), however, a sample set of visible rays from all directions of a given viewpoint may be obtained. By setting the angle of view of the six-view image taker to forty-five degrees, both vertically and horizontally, a viewing pyramid exactly one-sixth of the desired visible object space may be rendered. Then, by sampling visible rays six times, each time pointing the image taker (e.g., camera) in a different direction, i.e., up, down, right, left, front and back, a sample of the entire set of visible rays forming visible configuration vf may be obtained and assigned colors corresponding to the visible points on the image or object taken by the camera (real or virtual), as shown in FIG. 6*a*.

The colors thus assigned for each visible ray in the sample set can then be stored in the color table. The color table is similar to the table discussed above, except that the instant color table is divided into six distinct blocks (1–6) respectively corresponding to viewing directions (front, up, back, left, down, and right) relative to the viewpoint vp and the forward ray f of a viewer.

The following algorithm can be used in conjunction with the MEV™ flat surface algorithm to assign projected visual points $V_n$ the appropriate colors for display on the flat surface display.

```
if (θ > π/4 and θ ≦ 3π/4)
        {
        if (ψ ≦ arctan(1/sin(θ)))block = 1;
        else if (ψ ≦ π - arctan(1/sin(θ)))block = 2;
        else block = 3;
        }
else if (θ > 3π/4 and θ ≦ 5π/4)
        {
        if (ψ ≦ arctan(-1/cos(θ)))block = 1;
        else if (ψ ≦ π - arctan(-1/cos(θ)))block = 4;
        else block = 3;
        }
else if (θ > 5π/4 and θ ≦ 7π/4)
        {
        if (ψ ≦ arctan(-1/sin(θ)))block = 1;
        eise if (ψ ≦ π - arctan(-1/sin(θ)))block = 5;
        else block = 3;
        }
else if (θ > 7π/4 or θ ≦ π/4)
        {
        if (ψ ≦ arctan(1/cos(θ)))block = 1;
        else if (ψ ≦ π - arctan(1/cos(θ)))block = 6;
        else block = 3;
        }
if (block = 1)/* blocks 1,2,3,4,5,6 are front, up, back, left, down,
                                right */
        {
        x = cos(θ)tan(ψ)xscale + xoffset;
        y = imagesize - (sin(θ)tan(ψ)yscale + yoffset);
        return color(image1,x,y);
        }
if (block = 2)
        {
        x = tan(π/2 - θ)tan(ψ)xscale + xoffset;
        y = 1/cos(π/2 - θ)yscale + yoffset;
        return color(image2,x,y);
        }
if (block = 3)
        {
        x = imagesize - (cos(θ)tan(π - ψ)xscale + xoffset);
        y = imagesize - (sin(θ)tan(π - ψ)yscale + yoffset);
        return color(image3,x,y);
        }
if (block = 4)
        {
        x = 1/cos(π - θ)tan(π/2 - ψ)xscale + xoffset;
        y = imagesize - (tan(π - θ)yscale + yoffset);
        return color(image4,x,y);
        }
if (block = 5)
        {
        x = imagesize - (tan(π/2 - θ)xscale + xoffset);
        y = 1/cos(π/2 - θ)tan(π/2 - ψ)yscale + yoffset;
        return color(image5,x,y);
        }
if (block = 6)
        {
        x = imagesize - (1/cos(θ)tan(π/2 - ψ)xscale + xoffset);
        y = imagesize - (tan(θ)yscale + yoffset);
        return color(image6,x,y);
        }
```

Figure 6B:
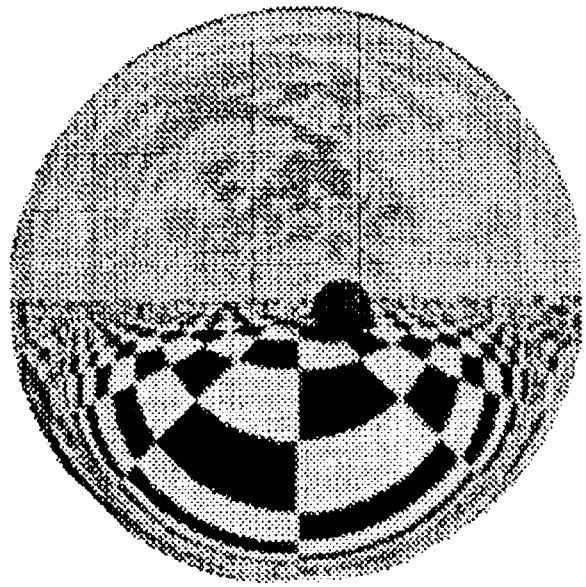
FIG. 6b illustrates a MindsEyeView™ display on a flat surface display device.
Figure 7A:
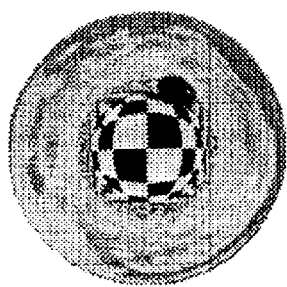
FIGS. 7a through 7f illustrate various MindsEyeView™ displays with different focal points, but with the same constant k≈∞.
Figure 7B:
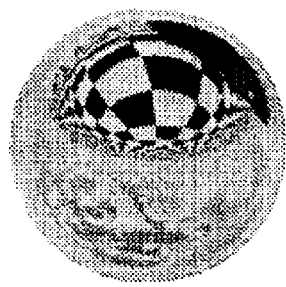
Figure 7C:
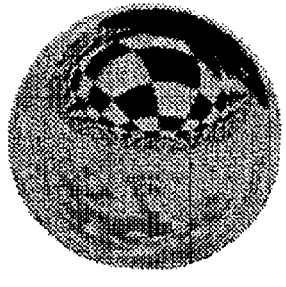
Figure 7F:
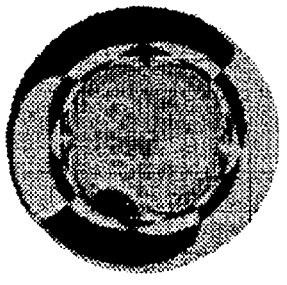
Figure 7E:
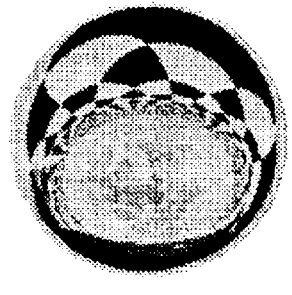
Figure 7D:
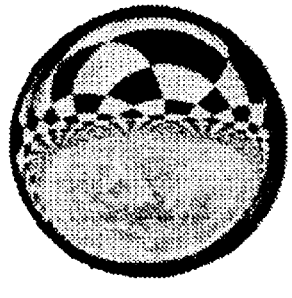

The image displayed on the flat surface as a result of both the flat surface and the coloring algorithms is shown in FIG. 6*b* (in the case where a configuration of k≈∞ was used). As should be appreciated, the upper, lower, right, and left portions of the displayed circle respectively correspond to the upper, lower, right, and left views of the scene as taken by the six-view image taker. The outer peripheral portions of the circle, however, correspond to the backwards view of the scene, i.e., the scene taken as the back view by the six-view image taker at the viewpoint of the viewer.

By changing the ray f in visible configuration vf, the displayed scene can be changed to reflect a change in the viewer's direction of vision, as shown in FIGS. 7a through 7f.

The apparatus described with reference to FIG. 5 can advantageously be configured to provide a system for producing a visual image wherein the spherical physical space occupied by, for example, an airplane can be displayed for the operators use. Preferably, the six-view image taker device 70 is replaced by six cameras 70a–70f, each oriented in a different viewing direction. Thus, each camera 70a–70f advantageously can provide one respective image to CPU 10.

It will be appreciated from the discussion above that the six-view image taker device 70 is configured so that all of the focal points of the cameras 70a–70f are coincident. From a practical standpoint, the focal point offset of cameras 70a–70f can be ignored when the offset distance from a desired focal point f is much less than the object imaged by it's respective camera. In applications where the coincidence of the focal point f is critical, the image produced by each of the cameras 70a–70f can be pre-processed by conventional techniques to correct for the focal point offset generated by each camera.

It will also be noted that the input data provided to image taker device 70 corresponds to six images defining a cubical image surface. On the other hand, the images generated by cameras 70a–70f are circular representations of their respective views. Thus, additional image processing is required to convert the input data to a form usable by the algorithm described above. Those of ordinary skill in the art will appreciate that the output of each camera can simply be cropped to thereby discard the unusable data generated by cameras 70a–70f. It will also be noted that correlation processing can be used to generate the input data in the form required by CPU 10.

Correlation processing is used in conventional video processing systems such as television systems to compare, for example, the correlation between first and second fields of a displayed image. According to the present invention, correlation processing advantageously can be used to identify image overlap between, for example, a forward image and the surrounding right, left, top and bottom images generated by other cameras. Once the overlap regions among the various images are identified, suitable hardware or software advantageously can be used to ensure that redundant pixels do not appear in the six-views generated by image taker device 70.

As should be readily appreciated, the present invention may be used to reduce or enlarge visible objects without changing their perceived shapes. Because the objects can be easily reduced while maintaining visual similarity to their original shapes, the present invention can produce visible stimuli that increases the peripheral vision of a viewer without deteriorating the integrity of the objects as induced in the mind of the viewer. As a result, a higher concentration of visually palpable information can be provided for a viewer. Thus, a pilot having a MEV™-based display would be able to view a full 360 degrees of air space surrounding his or her vantage point on a singe display surface, such as a so-called "heads-up" display. Similar effects can be used in video games, motion pictures, television productions, and theme park attractions.

In addition, the speed of image processing MEV™ images may be improved by preprocessing the MEV™ visual points or curves rather than computing them in real time. By forming a table of screen coordinates of MEV™ lines through points formatting an increasing angular difference from direction f, any line or line segment of any relation to the viewpoint vp can be quickly mapped on the MEV™ display by accessing the appropriate information in the MEV™ table thus formed. Thus, in video games and other systems that require high-speed graphic image processing, the MEV™ transformation provides a high-speed alternative to recalculating each visual image point making up a scene after a change in focal point is made by a viewer or user of the system.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for acquisition of a substantially seamless spherical data set and display of user selected portions thereof, comprising:

capturing at least two circular images from a single point and different directions of view;

transferring the circular images to a memory of a computer;

combining the circular images into a substantially seamless spherical data set; and displaying a user-selected portion of substantially seamless spherical data set on a display of the computer.

2. The method as set forth in claim 1, further comprising digitizing each of the circular images, wherein the digitizing is performed prior to transferring the substantially seamless spherical data set to the memory.

3. The method as set forth in claim 1, wherein the capturing is performed using a single wide-angle lens.

4. The method as set forth in claim 1, wherein the capturing is performed by taking at least two respective shots with a single claim camera with each respective shot being precisely registered with respect to the previously-taken shot.

5. The method as recited in claim 1, wherein the user-selected portion of the substantially seamless spherical data set includes data from two adjacent circular images.

6. The method as recited in claim 1, wherein the displaying step comprises displaying the user-selected portion of the substantially seamless spherical data set as a rectangular image on the display of the computer.

7. The method as recited in claim 1, wherein the displaying step comprises displaying the entire substantially seamless spherical data set as a rectangular image on the display of the computer.

8. The method as recited in claim 1, wherein the displaying step comprises displaying the user-selected portion of the subsequently seamless spherical data set in circular perspective on the display of the computer.

9. The method as recited in claim 1, further comprising the step of selecting a magnification level at which user-selected potion of the substantially seamless spherical data set is to be displayed on the display.

10. The method as recited in claim 1, wherein combining step is performed using software to digitally stitch together the at least two respective digital images.

11. A method for acquiring image content corresponding to all pixels visible from a predetermined point using a camera generating circular images, for processing the content into a substantially seamless spherical data set, and displaying user-selected portions of the substantially seamless spherical data set, the method comprising the steps of:

acquiring N circular images from the predetermined point and different directions of view;

transferring the N circular images to a memory;

combining the N circular images into the substantially seamless spherical data set; and displaying a user-selected portion of the substantially seamless data set on a display of the computer, where N is an integer greater than or equal to two.

12. The method as set forth in claim 11, further comprising digitizing each of the circular images, wherein the digitizing is performed prior to transferring the substantially seamless spherical data set to the memory.

13. The method as set forth in claim 11, wherein:

the acquiring and transferring steps are performed seriatim by a digital camera as each of the respective N circular images is taken, and the combining step is performed by a computer electrically coupled to the digital camera; and the user-selected portion of the substantially seamless spherical data set is determined by user operation of an input device.

14. The method as set forth in claim 11, wherein the capturing is performed by taking at least two respective shots with a single camera with each respective shot being precisely registered with respect to the previously-taken shot.

15. The method as recited in claim 11, wherein the user-selected portion of the substantially seamless spherical data set includes data from two adjacent circular images.

16. The method as recited in claim 11, wherein the displaying step comprises displaying the user-selected portion of the substantially seamless spherical data set as a rectangular image on the display of the computer.

17. The method as recited in claim 11, wherein the displaying step comprises displaying the entire substantially seamless spherical data set as a rectangular image on the display of the computer.

18. The method as recited in claim 11, wherein the displaying step comprises displaying the user-selected portion of the substantially seamless spherical data set in circular perspective on the display of the computer.

19. The method as recited in claim 11, further comprising the step of selecting a magnificant level at which user-selected potion of the substantially seamless spherical data set is to be displayed on the display.

20. The method as recited in claim 11, wherein combining step is performed using software to digitally stitch together the at least two respective digital images.

21. A method comprising:

taking at least two images from a single point and different directions of view, wherein each of the at least two images is a circular image; and combining the at least two images in such a manner as to create a substantially seamless spherical image, wherein the combining is performed by:
digitizing the at least two images to create at least two respective digital image; and then using software to digitally stitch together the at least two respective digital images.

22. A method comprising:

taking at least two images from a single point and different direction of view, wherein each of the at least two images is a circular image; and combining the at least two images in such a manner as to create a substantially seamless spherical image, wherein the combining is performed by:
digitizing the at least two images to create at least two respective digital images; and then using software to process the at least two respective digital images to eliminate redundant portions of the substantially seamless spherical image contained in any two of the least two respective digital images.

23. A method comprising:

using a programmed computer to digitally stitch together at least two digital, circular images that represent the visible world as seen from a single point and at least two respective directions of view, in such a manner as to generate a substantially spherical image data set; and using the programmed computer to display a user-selected portion of the substantially seamless spherical image data set on a display device.

24. The method as set forth in claim 23, wherein the user-selected portion of the spherical substantially image data set displayed on the display device is a rectangular image.

25. The method as set forth in claim 24, wherein the second using step is repeated a plurality of times so as to generate a sequence of rectangular images on the display device.

26. A method comprising:

capturing at least two images from a single point and different directions of view, wherein each of the at least two images is a circular image;

digitizing each of the at least two images to thereby generate at least two respective image data sets; and generating a spherical image data set by combining the at least two respective image data sets.

27. The method as set forth in claim 26, further comprising displaying a magnified portion of the spherical image data set.

28. The method as set forth in claim 26, further comprising using a programmed computer graphics system to generate an image having a selected perspective in response to the spherical image data set.

29. The method as set forth in claim 26, wherein the capturing is performed by taking at least two respective shots with a single camera with each respective shot being precisely registered with respect to the previously-taken shot.

* * * * *